(12) United States Patent
Balasubramanian et al.

(10) Patent No.: US 11,486,783 B2
(45) Date of Patent: Nov. 1, 2022

(54) STAND-ALONE WATER DETECTOR

(71) Applicant: Apple Inc., Cupertino, CA (US)

(72) Inventors: Ashwin Balasubramanian, Sunnyvale, CA (US); David MacNeil, Sunnyvale, CA (US); Roberto M. Ribeiro, San Jose, CA (US); Brentley M. Wiles, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 250 days.

(21) Appl. No.: 17/033,558

(22) Filed: Sep. 25, 2020

(65) Prior Publication Data

US 2022/0099513 A1 Mar. 31, 2022

(51) Int. Cl.
*G01L 9/00* (2006.01)
*H04W 4/80* (2018.01)

(52) U.S. Cl.
CPC .......... *G01L 9/0073* (2013.01); *G01L 9/008* (2013.01); *G01L 9/0042* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 7,467,558 B2* | 12/2008 | Fukuda | H01L 41/0533 73/777 |
| 2004/0036484 A1* | 2/2004 | Tamai | G01N 27/225 324/663 |
| 2019/0149899 A1* | 5/2019 | Leonhardt | H04R 7/04 381/386 |
| 2021/0148846 A1* | 5/2021 | Kabany | B60N 2/58 |

* cited by examiner

*Primary Examiner* — Peter J Macchiarolo
*Assistant Examiner* — Jermaine L Jenkins
(74) *Attorney, Agent, or Firm* — BakerHostetler

(57) ABSTRACT

According to some aspects of the subject technology, an apparatus includes a first electrode, a second electrode and a dielectric membrane disposed between the first electrode and the second electrode. The first electrode and the second electrode include a number of pores within a region of an input port of the apparatus. The first electrode, the second electrode and the dielectric membrane form a capacitor that is configured to enable detection of occlusion of the input port by water.

20 Claims, 4 Drawing Sheets

STAND-ALONE WATER DETECTOR

TECHNICAL FIELD

The present description relates generally to sensor technology, and, more particularly, but not exclusively, to a stand-alone water detector with an expanded polytetrafluoroethylene (ePTFE) membrane architecture.

BACKGROUND

Portable electronic devices such as smartphones and smartwatches include pressure sensors for perceiving environmental pressure. The pressure sensor is sometimes used for barometric pressure measurements, which can be used to identify changes in elevation or depth in water. The changes in elevation are sometimes used to identify a location or exercise performed by a user of the device. For example, an activity-monitor application running on processing circuitry of the device, worn or carried by the user while the user walks or runs up a flight of stairs or up a hill, may measure elevation changes. Portable electronic devices most commonly use capacitive or piezo-resistive micro-electromechanical system (MEMS) pressure sensors.

Wearable devices are required to survive increasingly more stringent reliability requirements such as dust, sand or other debris exposure. Gel-filled sensors have been used to survive these requirements but are vulnerable to pressure errors due to orientation sensitivity and capillary pressure errors due to water in the gel surface. Gel elimination by using an expanded polytetrafluoroethylene (ePTFE) membrane or mesh to provide environmental robustness is possible, but the membrane and/or mesh is prone to water occlusion.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1:
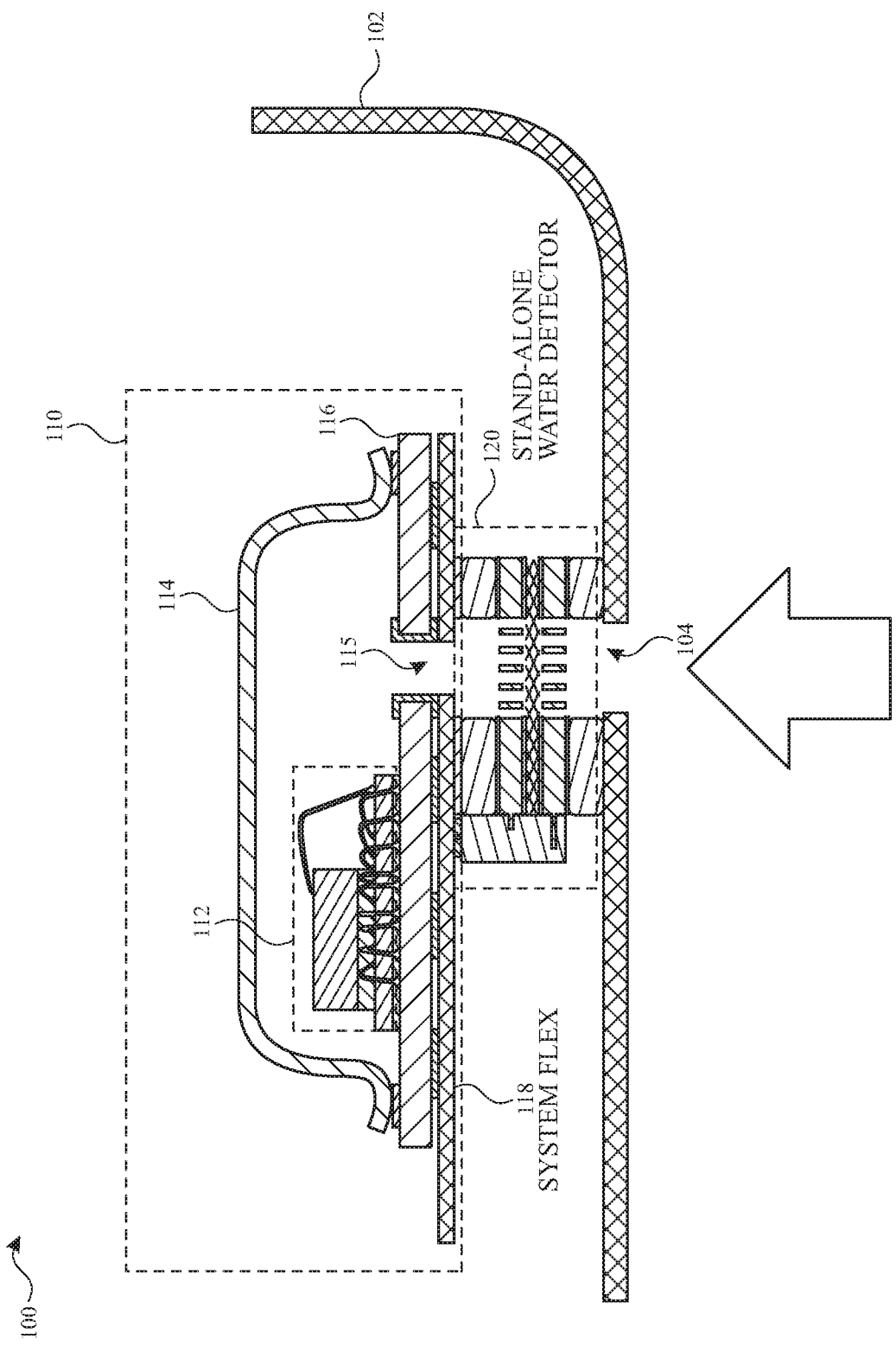
FIG. 1 is a schematic diagram illustrating an example of a system using a stand-alone water-detector device with an expanded polytetrafluoroethylene (ePTFE) membrane, in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description, which includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block-diagram form in order to avoid obscuring the concepts of the subject technology.

In some aspects, the subject disclosure provides a stand-alone water detector with expanded polytetrafluoroethylene (ePTFE) membrane architecture. The disclosed stand-alone water detector includes a parallel plate capacitor with an ePTFE membrane sandwiched in the middle. The ePTFE membrane serves as a dielectric layer of the parallel plate capacitor. The two parallel plates are made of a metal such as stainless steel (SUS) plated with a corrosion-resistant material and serve as the electrodes of the capacitor and structural stiffeners for the ePTFE membrane. The SUS electrodes are routed to a small printed-circuit board (PCB) such as a flame retardant-4 (FR4) PCB or polyimide (PI) flex that is used to send the capacitance signal to a signal processor (e.g., ASIC, μC, SOC) via the system flex or another electrical routing. Examples of the signal processor includes an application-specific integrated circuit (ASIC), a microcontroller, a system on a chip (SOC) or a general processor of a host device such as a smartphone or a smartwatch. When the sensor is completely dry, air forms the dielectric medium between the two mesh parallel plates and produces a dry-capacitance value (C-dry). When the sensor is wet, water will trap between the two mesh parallel plates, changing the dielectric constant and resulting in a wet-capacitance value (C-wet). The balance of the stack-up includes a sealing material made of, for example, foam and pressure-sensitive adhesive (PSA) used to create a sealing interface between a system (e.g., a wearable communications devices such as a smartphone or a smartwatch) and the outside environment.

Wearable devices use gel-filled sensors to survive increasingly more stringent reliability requirements such as dust, sand or other debris exposure. These devices, however, are vulnerable to pressure errors due to a number of factors including orientation sensitivity and capillary pressure errors due to water in the gel surface. The use of ePTFE membrane or mesh instead of gel can provide environmental robustness, but the membrane and/or mesh is prone to water occlusion.

Gel elimination by using an ePTFE membrane or mesh to provide environmental robustness is possible, but the membrane and/or mesh is prone to water occlusion. Detection of water occlusion is important, as capillary pressure errors can produce feature-level errors when the pressure-sensor output is used for calculating altitude changes, exercise metrics or floor-level location for enhanced 911 (E911), which is used for wireless phone users who dial 911. The water-detection technique of the subject technology can be used to alert the system (e.g., a wearable communication device) of capillary pressure errors to avoid feature-level errors.

It should be emphasized that the water detector of the subject technology is a stand-alone design that can be integrated in many different ways into a host system or device. In some aspects, replacing the ePTFE material with the system barometric vent material could negate the need for water detection to be part of the lightning-cable interface. In addition this could be further extended to any sensor that needs to interact with the outside environment.

FIG. 1 is a schematic diagram illustrating an example of a system 100 using a stand-alone water-detector device 120 with an expanded polytetrafluoroethylene (ePTFE) membrane, in accordance with various aspects of the subject technology. The system 100 can be any system including an apparatus 110 that uses the stand-alone water-detector device 120 with an ePTFE membrane (hereinafter, the device 120) to protect the apparatus 110. In some aspects, the system 100 can be a handheld communication device such as a smartphone or a smartwatch. The apparatus 110 can be a sensor apparatus incorporated in the system 100 and can include a sensor device 112 (e.g., an environmental sensor such as a pressure sensor or a gas sensor) inside a cavity of a housing 114 that is mounted on a substrate 116. The apparatus 110 includes a port 115 that is protected from water occlusion by the device 120. The apparatus 110 is mounted on a system flex 118, which also includes a hole as part of the port 115. The apparatus 110 and the device 120 are mounted on a system housing 102, which includes a port 104 that allows air from the environment while detecting water occlusion. In some aspects, the device 120 can be used to obliterate the water accumulated on the device 120, as described in more detail herein.

Figure 2:
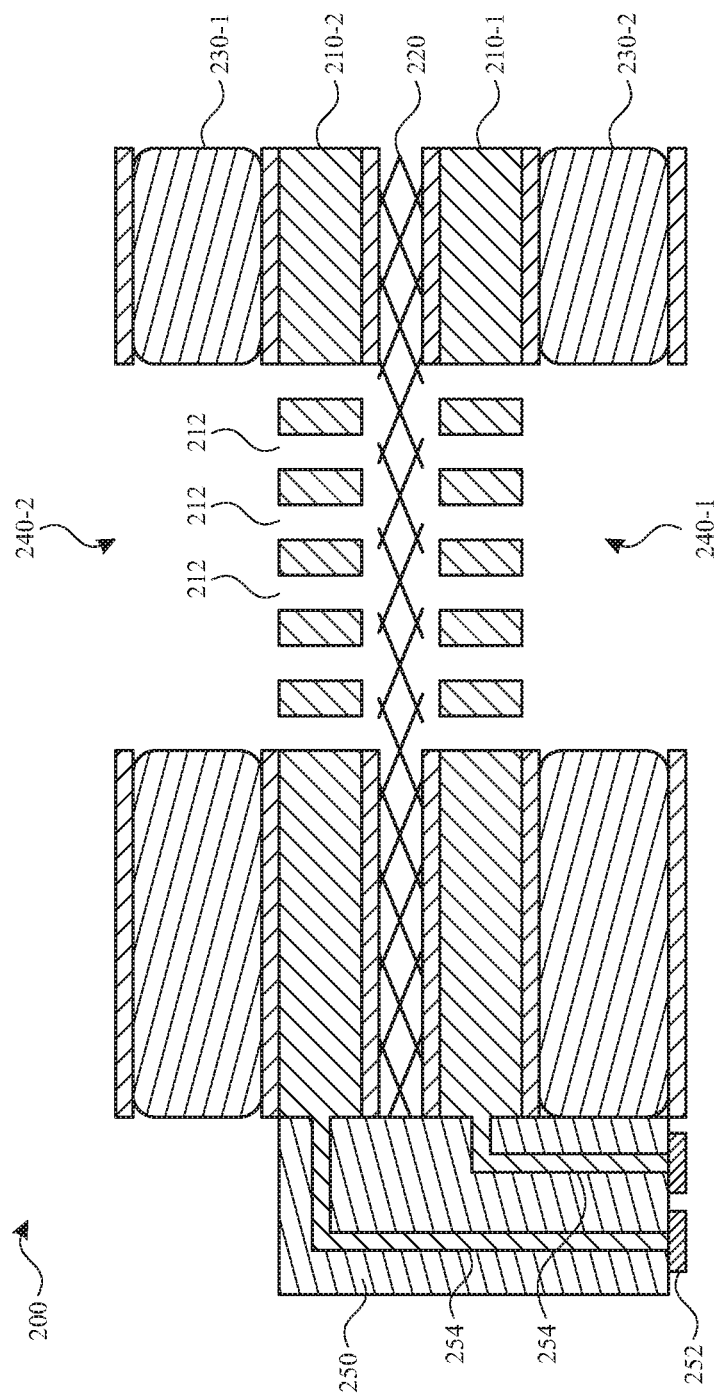
FIG. 2 is a schematic diagram illustrating an example of a stand-alone water-detector device with an ePTFE membrane, in accordance with various aspects of the subject technology.

FIG. 2 is a schematic diagram illustrating an example of a stand-alone water-detector device 200 with an ePTFE membrane, in accordance with various aspects of the subject technology. The stand-alone water-detector device 200 (hereinafter, the device 200) is the same as the device 120 of FIG. 1, which is described in more detail herein. The device 200 is a stand-alone water detection device in the sense that it can be built separately and integrated with any sensor device or system. The stand-alone device can be used to replace a system-level venting membrane to provide the system with more contextual awareness into its current state, which would allow it behave in an intelligent manner (alert user, shutdown, etc.). In addition the stand-alone device could be used in other devices such as speakers or microphones to provide contextual awareness to run a water-ejection tone or tune-driving and sensing parameters based on water-log state (i.e. gains, filtering, etc.). The device 200 includes an ePTFE membrane 220 sandwiched between two electrodes 210 (210-1 and 210-2), sealing interfaces 230 (230-1 and 230-2) and a PCB 250. Each of the electrodes 210 includes a porous area including a number of pores 212 within ports 240 (e.g., 240-1 and 240-2). Any of the ports 240 (e.g., 240-1 or 240-2) can be an input port or an output port of the device 200. The electrodes 210 are coupled to soldering pads 252 via conductive traces 254 on the PCB 250, which can be an FR4 PCB or a PI flex. The sealing interfaces 230 can be made of foam and are attached to the electrodes 210 and parts of a host system (e.g., system flex 118 and the system housing 102 of FIG. 1) via layers of PSA.

The ePTFE membrane 220 and the electrodes 210, respectively, form a dielectric layer and the conductive electrodes of a capacitor, which is responsible for water detection of the device 200. A capacitance value of this capacitor formed by the electrodes 210 is measured by an electronic circuit (e.g., an ASIC) including analog and/or digital circuitry) connected to the soldering pads 252. The value of this capacitance changes with the presence of water to C-wet from C-dry and can be used to detect the presence of water occlusion. The detection of water by the electronic circuit can be reported to a processor of the host system (e.g., a smartwatch or a smartphone). The processor may deactivate a sensor apparatus (e.g., 110 of the system 100 of FIG. 1) protected by the device 200, or designate its measurement results as invalid, while the water occlusion of the ports 240 persists. In some implementations, the water may be obliterated by leveraging resistive heating, for example, by running a current through the resistance of the wet ePTFE membrane 220. In particular, the sweat and salty water can produce enough conductivity for electric current to pass through the wet ePTFE membrane 220.

In some implementations, the electrode 210 may be made of a metal such as stainless steel (SUS) and plated with a corrosion-resistant material. In one or more implementations, other metals such as titanium plated with platinum can also be used. In some aspects, the diameter of the pores 212 can be within a range of about 20-50 μm. In one or more aspects, the thickness of the ePTFE membrane 220 can be within a range of about 10-50 μm.

Figure 3:
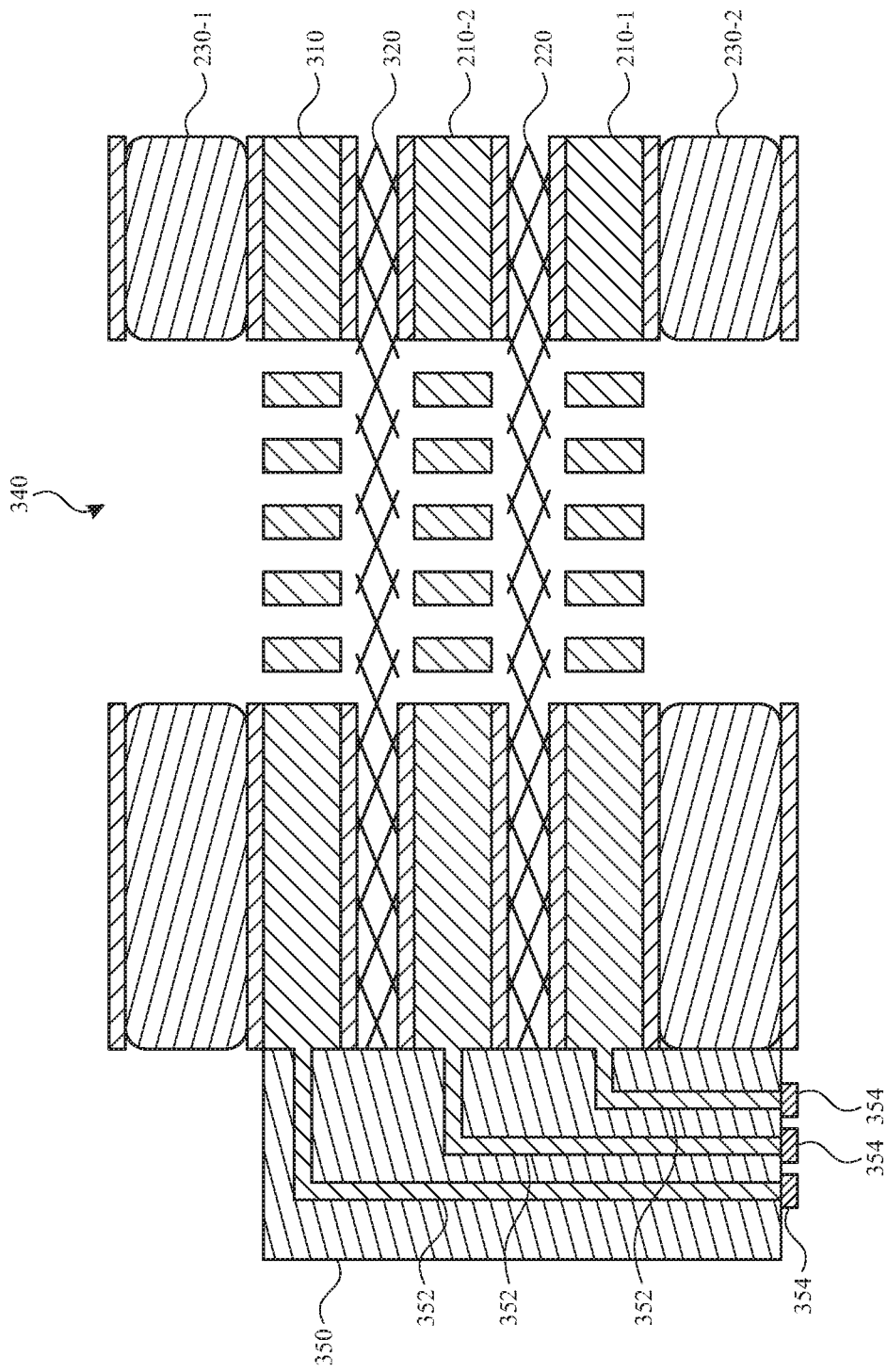
FIG. 3 is a schematic diagram illustrating an example of a stand-alone water-detector device with ePTFE membranes, in accordance with various aspects of the subject technology.

FIG. 3 is a schematic diagram illustrating an example of a stand-alone water-detector device 300 with ePTFE membranes, in accordance with various aspects of the subject technology. The stand-alone water-detector device 300 with ePTFE membranes (hereinafter, the device 300) is similar to the device 200 of FIG. 2, except for the addition of ePTFE membrane 320 and the electrode 310, which are similar to the ePTFE membrane 220 and the electrodes 210 of FIG. 2. Conductive traces 352 on the PCB 350 conductively couple the electrodes 210 and 310 to soldering pads 354, which allows connection of the electrodes 210 and 310 to an electronic circuit. The sealing interfaces 230, as described above, are formed of foam and are applied using PSA layers.

The addition of the electrode 310 allows using a differential capacitance measurement, with electrode 210-2 being a ground electrode. For example, if the port 340 is the input port exposed to the environment, the capacitance between the electrode 310 and electrode 210-2 can be C-wet and the capacitance between the electrode 210-2 and 210-1 can be C-dry, and the differential capacitance can be C-wet minus C-dry (when water has not yet reached the ePTFE membrane 220).

Figure 4:
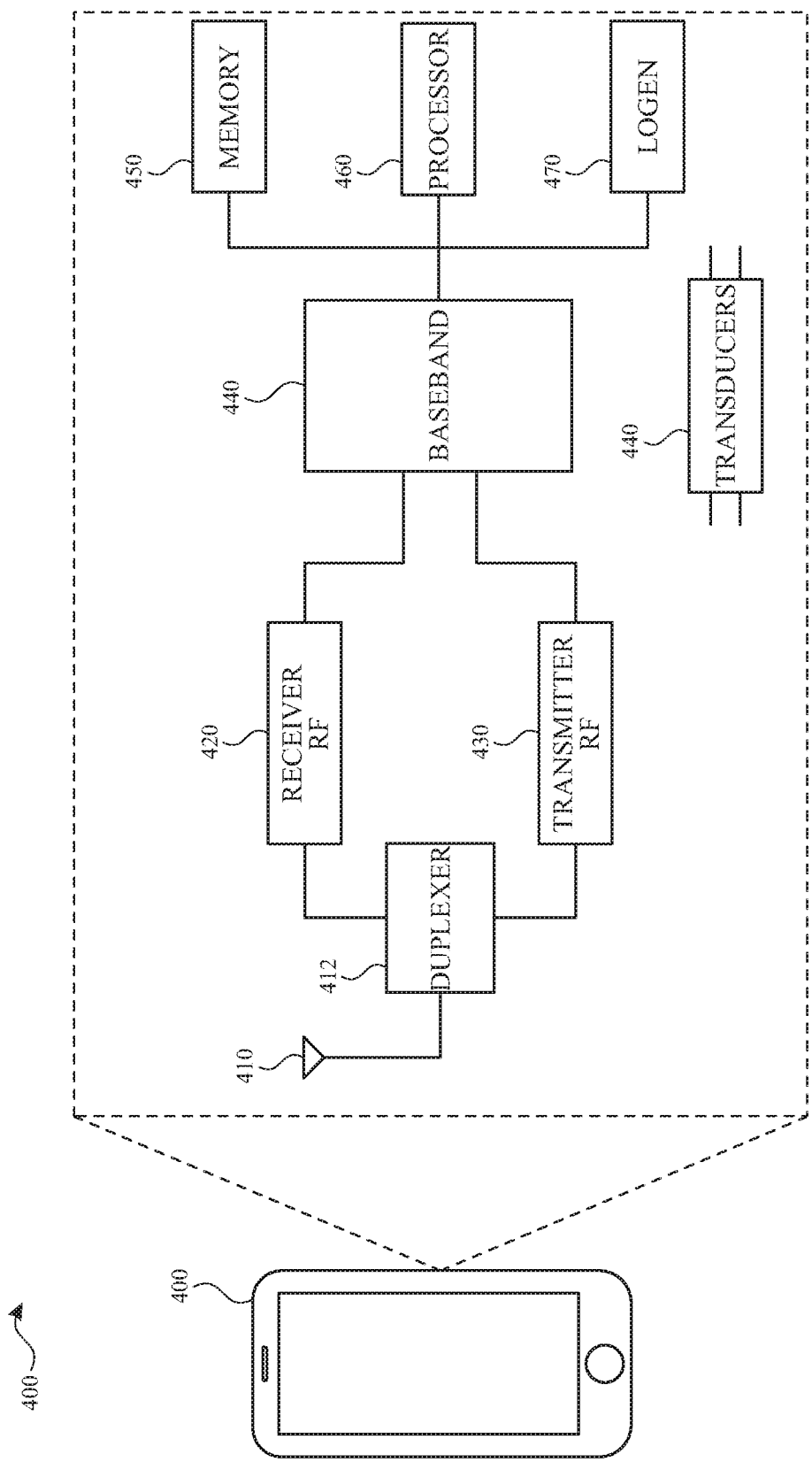
FIG. 4 illustrates a wireless communication device in which aspects of subject technology are implemented.

FIG. 4 illustrates a wireless communication device in which aspects of the subject technology are implemented. In one or more implementations, the wireless communication device 400 can be a smartphone or a smartwatch that hosts an apparatus of the subject technology, for example, for pressure, elevation and depth in water measurements. The wireless communication device 400 may comprise a radio-frequency (RF) antenna 410, a duplexer 412, a receiver 420, a transmitter 430, a baseband processing module 440, a memory 450, a processor 460, a local oscillator generator (LOGEN) 470 and one or more transducers 480. In various embodiments of the subject technology, one or more of the blocks represented in FIG. 4 may be integrated on one or more semiconductor substrates. For example, the blocks 420-470 may be realized in a single chip or a single system on a chip, or may be realized in a multichip chipset.

The receiver 420 may comprise suitable logic circuitry and/or code that may be operable to receive and process signals from the RF antenna 410. The receiver 420 may, for example, be operable to amplify and/or down-convert received wireless signals. In various embodiments of the subject technology, the receiver 420 may be operable to cancel noise in received signals and may be linear over a wide range of frequencies. In this manner, the receiver 420 may be suitable for receiving signals in accordance with a variety of wireless standards, Wi-Fi, WiMAX, Bluetooth, and various cellular standards.

The transmitter 430 may comprise suitable logic circuitry and/or code that may be operable to process and transmit signals from the RF antenna 410. The transmitter 430 may, for example, be operable to up-convert baseband signals to RF signals and amplify RF signals. In various embodiments of the subject technology, the transmitter 430 may be operable to up-convert and amplify baseband signals processed in accordance with a variety of wireless standards.

Examples of such standards may include Wi-Fi, WiMAX, Bluetooth, and various cellular standards. In various embodiments of the subject technology, the transmitter 430 may be operable to provide signals for further amplification by one or more power amplifiers.

The duplexer 412 may provide isolation in the transmit band to avoid saturation of the receiver 420 or damaging parts of the receiver 420, and to relax one or more design requirements of the receiver 420. Furthermore, the duplexer 412 may attenuate the noise in the receiver band. The duplexer 412 may be operable in multiple frequency bands of various wireless standards.

The baseband processing module 440 may comprise suitable logic, circuitry, interfaces, and/or code that may be operable to perform processing of baseband signals. The baseband processing module 440 may, for example, analyze received signals and generate control and/or feedback signals for configuring various components of the wireless communication device 400, such as the receiver 420. The baseband processing module 440 may be operable to encode, decode, transcode, modulate, demodulate, encrypt, decrypt, scramble, descramble, and/or otherwise process data in accordance with one or more wireless standards.

The processor 460 may comprise suitable logic, circuitry, and/or code that may enable processing data and/or controlling operations of the wireless communication device 400. In this regard, the processor 460 may be enabled to provide control signals to various other portions of the wireless communication device 400. The processor 460 may also control transfer of data between various portions of the wireless communication device 400. Additionally, the processor 460 may enable implementation of an operating system or otherwise execute code to manage operations of the wireless communication device 400.

The memory 450 may comprise suitable logic, circuitry, and/or code that may enable storage of various types of information such as received data, generated data, code, and/or configuration information. The memory 450 may comprise, for example, RAM, ROM, flash, and/or magnetic storage. In various embodiments of the subject technology, information stored in the memory 450 may be utilized for configuring the receiver 420 and/or the baseband processing module 440.

The LOGEN 470 may comprise suitable logic, circuitry, interfaces, and/or code that may be operable to generate one or more oscillating signals of one or more frequencies. The LOGEN 470 may be operable to generate digital and/or analog signals. In this manner, the LOGEN 470 may be operable to generate one or more clock signals and/or sinusoidal signals. Characteristics of the oscillating signals such as the frequency and duty cycle may be determined based on one or more control signals from, for example, the processor 460 and/or the baseband processing module 440.

In operation, the processor 460 may configure the various components of the wireless communication device 400 based on a wireless standard according to which it is desired to receive signals. Wireless signals may be received via the RF antenna 410, amplified, and down-converted by the receiver 420. The baseband processing module 440 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 450, and/or information affecting and/or enabling operation of the wireless communication device 400. The baseband processing module 440 may modulate, encode, and perform other processing on audio, video, and/or control signals to be transmitted by the transmitter 430 in accordance with various wireless standards.

The one or more transducers 480 may include miniature transducers such as an environmental sensor (e.g., a pressure sensor or a gas sensor) protected from water occlusion by the stand-alone water-detector device with ePTFE membranes, in various embodiments of the subject technology (e.g., 200 of FIG. 2 or 300 of FIG. 3).

In accordance with various aspects of the subject disclosure, an apparatus includes a first electrode, a second electrode and a dielectric membrane disposed between the first electrode and the second electrode. The first electrode and the second electrode include a number of pores within a region of an input port of the apparatus. The first electrode, the second electrode and the dielectric membrane form a capacitor that is configured to enable detection of occlusion of the input port by water.

In accordance with other aspects of the subject disclosure, a system includes an apparatus including a sensor disposed in a first housing and a water-detection device disposed on an input port of the apparatus. The water-detection device includes a first metal plate, a second metal plate and a membrane disposed between the first metal plate and the second metal plate. The first metal plate and the second metal plate include pores within a region of the input port of the apparatus, and the first metal plate and the second metal plate and the membrane form a capacitor that is configured to enable detection of occlusion of the input port by water.

In accordance with other aspects of the subject disclosure, a wireless communication device consists of a housing including a first port, an apparatus including a sensor and second port, and a water-detection device disposed between the first port and the second port. The water-detection device includes a first and a second permeable electrode and a dielectric membrane disposed between the first and the second permeable electrodes. The first and the second permeable electrodes include pores within a region of the first port and the second port, and the first and the second permeable electrodes and the dielectric membrane form a capacitor that is configured to enable detection of occlusion of the first port by water.

Various types of signal processing described above can be implemented in digital electronic circuitry, or in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special-purpose computing devices and storage devices can be interconnected through communication networks.

Some implementations include electronic components such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW), flash memory (e.g., SD cards, mini-SD cards, micro-SD cards), magnetic and/or solid-state hard drives, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multicore processors that execute software, some implementations are performed by one or more integrated circuits, such as ASICs or field-programmable gate arrays (FPGAs). In some implementations, such integrated circuits execute instructions that are stored on the circuit itself.

As used in this specification and any claims of this application, the terms "computer," "processor," and "memory" all refer to electronic or other technological devices. These terms exclude people or groups of people. For purposes of the specification, the terms "display" and "displaying" mean displaying on an electronic device. As used in this specification and any claims of this application, the terms "computer-readable medium" and "computer readable media" are entirely restricted to tangible, physical objects that store information in a form that is readable by a computer. These terms exclude any wireless signals, wired download signals, and any other ephemeral signals.

Many of the above-described features and applications are implemented as software processes that are specified as a set of instructions recorded on a computer-readable storage medium (also referred to as a computer-readable medium). When these instructions are executed by one or more processing unit(s) (e.g., one or more processors, cores of processors, or other processing units), they cause the processing unit(s) to perform the actions indicated in the instructions.

In this specification, the term "software" is meant to include firmware residing in read-only memory or applications stored in magnetic storage, which can be read into memory for processing by a processor. Also, in some implementations, multiple software aspects of the subject disclosure can be implemented as subparts of a larger program while remaining distinct software aspects of the subject disclosure. In some implementations, multiple software aspects can also be implemented as separate programs. Finally, any combination of separate programs that together implement a software aspect described herein is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, or declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks may be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but, rather, are intended to be used interchangeably. For example, a processor configured to monitor and control an operation or a component may also mean the processor being programmed to monitor and control the operation, or the processor being operable to monitor and control the operation. Likewise, a processor configured to execute code can be construed as a processor programmed to execute code or operable to execute code.

A term such as an aspect does not imply that such aspect is essential to the subject technology or that such aspect applies to all configurations of the subject technology. A disclosure relating to an aspect may apply to all configurations, or one or more configurations. A term such as "an aspect" may refer to one or more aspects and vice versa. A term such as "a configuration" does not imply that such configuration is essential to the subject technology or that such configuration applies to all configurations of the subject technology. A disclosure relating to a configuration may apply to all configurations, or one or more configurations. A term such as "a configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An apparatus comprising:
a first electrode and a second electrode; and
a dielectric membrane disposed between the first electrode and the second electrode,
wherein:
the first electrode and the second electrode include a plurality of pores within a region of an input port of the apparatus, and
the first electrode, the second electrode and the dielectric membrane form a capacitor that is configured to enable detection of occlusion of the input port by water.

2. The apparatus of claim 1, wherein the first electrode and the second electrode are made of stainless steel and are plated with a corrosion-resistant material.

3. The apparatus of claim 2, wherein the first electrode and the second electrode are made of titanium and are plated with a corrosion-resistant material.

4. The apparatus of claim 1, wherein the dielectric membrane comprises expanded polytetrafluoroethylene (ePTFE).

5. The apparatus of claim 1, further comprising layers of a sealing interface isolating the first electrode and the second electrode from a housing of a host system, wherein the sealing interface comprises one or more layers of a foam and a pressure-sensitive adhesive (PSA).

6. The apparatus of claim 1, wherein the first electrode and the second electrode are routed through conductive traces of a printed circuit board (PCB) to an electronic circuit.

7. The apparatus of claim 6, wherein the electronic circuit is configured to detect occlusion of the input port by water.

8. The apparatus of claim 6, wherein the electronic circuit is configured to detect occlusion of the input port by water via measuring a value of a capacitance value of the capacitor.

9. The apparatus of claim 8, wherein the electronic circuit is configured to detect occlusion of the input port by water via detecting a change of the capacitance value from a dry capacitance (C-dry) value that is measured when the apparatus is dry.

10. The apparatus of claim 9, wherein the electronic circuit is configured to send a report of a wet condition to a processor of a host system when occlusion of the input port by water is detected.

11. The apparatus of claim 10, wherein the processor is configured to execute a mitigation process to remove the occlusion of the input port in response to receiving the report from the electronic circuit.

12. A system comprising:
an apparatus including a sensor disposed in a first housing; and
a water-detection device disposed on an input port of the apparatus, the water-detection device comprising:
a first metal plate and a second metal plate;
a membrane disposed between the first metal plate and the second metal plate,
wherein:
the first metal plate and the second metal plate include pores within a region of the input port of the apparatus, and
the first metal plate and the second metal plate and the membrane form a capacitor that is configured to enable detection of occlusion of the input port by water.

13. The system of claim 12, wherein the first metal plate and the second metal plate are made of one of stainless steel or titanium and plated with a corrosion-resistant material.

14. The system of claim 12, wherein the membrane comprises a dielectric material including ePTFE.

15. The system of claim 12, wherein the water-detection device further comprises layers of a sealing interface isolating the first metal plate and the second metal plate from the first housing and a second housing of the system, and wherein the sealing interface comprises one or more layers of a foam and a PSA.

16. The system of claim 12, wherein the first metal plate and the second metal plate are routed through conductive traces of a PCB to an electronic circuit configured to detect occlusion of the input port by water.

17. The system of claim 16, wherein the electronic circuit is configured to detect occlusion of the input port by water via measuring a value of a capacitance value of the capacitor by determining a change of the capacitance value from a dry capacitance (C-dry) value that is measured when the apparatus is dry.

18. The system of claim 16, wherein the electronic circuit is configured to report a wet condition to a processor of a host system when occlusion of the input port by water is detected, and wherein the processor is configured to execute a mitigation process to remove the occlusion of the input port.

19. A wireless communication device, the device comprising:
a housing including a first port;
an apparatus including a sensor and second port; and
a water-detection device disposed between the first port and the second port, the water-detection device comprising:
a first and a second permeable electrode; and
a dielectric membrane disposed between the first and the second permeable electrodes,
wherein:
the first and the second permeable electrodes include pores within a region of the first port and the second port, and
the first and the second permeable electrodes and the dielectric membrane form a capacitor that is configured to enable detection of occlusion of the first port by water.

20. The device of claim 19, wherein:
the first and the second permeable electrodes are routed through conductive traces of a PCB to an electronic circuit, and
the electronic circuit is configured to:
detect occlusion of the first port by water via measuring a value of a capacitance value of the capacitor and detecting a change of the capacitance value from a C-dry value that is measured when the apparatus is dry; and
report a wet condition to a processor of a host system when occlusion of the first port by water is detected.

* * * * *